(12) United States Patent
Jiang et al.

(10) Patent No.: US 12,294,425 B2
(45) Date of Patent: *May 6, 2025

(54) METHOD AND DEVICE FOR POWER ADJUSTMENT IN UE AND BASE STATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI QIYU COMMUNICATION TECHNOLOGY SERVICE CENTER, Shanghai (CN)

( * ) Notice: Subject to any disclaimer, the term of this patent is extended or adjusted under 35 U.S.C. 154(b) by 119 days.

This patent is subject to a terminal disclaimer.

(21) Appl. No.: 18/102,725

(22) Filed: Jan. 29, 2023

(65) Prior Publication Data

US 2023/0170947 A1    Jun. 1, 2023

Related U.S. Application Data

(63) Continuation of application No. 17/472,588, filed on Sep. 11, 2021, now Pat. No. 11,601,167, which is a
(Continued)

(30) Foreign Application Priority Data

Dec. 29, 2016 (CN) .......................... 201611253311.4

(51) Int. Cl.
*H04B 7/04* (2017.01)
*H04B 7/0426* (2017.01)
(Continued)

(52) U.S. Cl.
CPC ........... *H04B 7/043* (2013.01); *H04L 5/0023* (2013.01); *H04W 52/242* (2013.01); *H04W 52/325* (2013.01)

(58) Field of Classification Search
CPC .... H04B 7/043; H04L 5/0023; H04W 52/242; H04W 52/325
(Continued)

(56) References Cited

U.S. PATENT DOCUMENTS 11,601,167 B2*  3/2023  Jiang ................... H04W 52/242
11,601,173 B2*  3/2023  Noh ..................... H04B 7/0695
(Continued)

FOREIGN PATENT DOCUMENTS

CN        1893302 A      1/2007
CN      101989873 A      3/2011
(Continued)

OTHER PUBLICATIONS

First Office Action received in application No. CN201910061861.3 dated Oct. 11, 2021.
(Continued)

*Primary Examiner* — Kevin M Burd

(57) ABSTRACT

A method and device for power adjustment in a user equipment and a base station are disclosed in the present disclosure. The user equipment receives first information which is used to trigger a first operation, and then receives K piece(s) of target information and transmits a first wireless signal. A transmission power value of the first wireless signal is a first power value; the first power value is irrelevant to all piece(s) of target information received prior to triggering the first operation. The K piece(s) of target information is(are) received after triggering the first operation. The sum of K power offset value(s) is used to determine the first power value. The K power offset value(s) are respectively indicated by the K piece(s) of target information.

20 Claims, 8 Drawing Sheets

Related U.S. Application Data continuation of application No. 16/455,767, filed on Jun. 28, 2019, now Pat. No. 11,201,642, which is a continuation of application No. PCT/CN2017/114557, filed on Dec. 5, 2017.

(51) Int. Cl.
  *H04L 5/00* (2006.01)
  *H04W 52/24* (2009.01)
  *H04W 52/32* (2009.01)

(58) Field of Classification Search
  USPC ............................................. 375/262
  See application file for complete search history.

(56) References Cited

U.S. PATENT DOCUMENTS

| | | | |
|---|---|---|---|
| 2012/0134332 A1 | 5/2012 | Lin et al. | |
| 2016/0143055 A1* | 5/2016 | Nammi | H04B 7/0617 370/329 |

FOREIGN PATENT DOCUMENTS

| | | |
|---|---|---|
| CN | 2011102666 A2 | 8/2011 |
| CN | 102368868 A | 3/2012 |
| CN | 102577542 A | 7/2012 |
| CN | 102763463 A | 10/2012 |
| CN | 102783226 A | 11/2012 |
| CN | 102934498 A | 2/2013 |
| CN | 102958147 A | 3/2013 |
| CN | 103548396 A | 1/2014 |
| CN | 103733698 A | 4/2014 |

OTHER PUBLICATIONS

First Search Report received in application No. CN201910061861.3 dated Jan. 20, 2021.

Notice allowance received in application No. CN201910061861.3 dated Apr. 16, 2021.

3GPP 3rd Generation Partnership Project; Technical Group Specification Radio Access Network; UTRAN 1 interface Radio Network Subsystem Application Part(RNSAP) signalling (Release 13).

Baolei Li Uplink Power Control in MU-MIMO Systems «Modern Science & Technology of Telecommunications» Oct. 31, 2010.

International Search Report received in application No. PCT/CN2017/114557 dated Feb. 8, 2018.

Huawei et al. "3GPPTSG RAN WG1 Meeting #86, R1-167226", Uplink Power Control, Aug. 26, 2016(Aug. 26, 2016). the whole document.

First Office Action received in application No. CN201611253311.4 dated Dec. 11, 2018.

First Search Report received in application No. CN201611253311.4 dated Nov. 30, 2018.

* cited by examiner

METHOD AND DEVICE FOR POWER ADJUSTMENT IN UE AND BASE STATION

CROSS-REFERENCE TO RELATED APPLICATION

This application is a continuation of U.S. patent Ser. No. 17/472,588, filed on Sep. 11, 2021, which is a continuation of the U.S. patent Ser. No. 16/455,767, filed on Jun. 28, 2019, which is a continuation of International Application No. PCT/CN2017/114557, filed Dec. 5, 2017, claiming the priority benefit of Chinese Patent Application Serial Number 201611253311.4, filed on Dec. 29, 2016, the full disclosure of which is incorporated herein by reference.

BACKGROUND

Technical Field

The present disclosure relates to a transmission method and device for supporting power adjustment in a wireless communication system, and more particularly to a transmission scheme and device for supporting power adjustment in a wireless communication system in which a large number of antennas are deployed on a base station side.

Related Art

In the existing Long Term Evolution (LTE) system, Reset of Accumulation in the uplink power control mechanism is triggered by the reconfiguration of the p0-UE-PUSCH field in the Radio Resource Control (RRC) signaling or Random Access Response (RAR) information. The p0-UE-PUSCH field is UE-specific signaling.

Massive Multiple-Input Multiple-Output (MIMO) has become a research hotspot for next-generation mobile communications. In massive MIMO, multiple antennas can improve communication quality by forming narrower beams pointing in a specific direction through beamforming. Since the beam width is very narrow, the transmission paths of beams pointing in different directions are different. This causes significant differences among long-term channel fading experienced by signals using different beamforming vectors. This differences among long-term channel fading brings new problems to Reset of Accumulation in the uplink power control mechanism.

SUMMARY

Through research, the inventors found that an intuitive mechanism for Reset of Accumulation in large-scale MIMO scenarios is that each beam uses an independent reset mechanism. The base station transmits an independent p0-UE-PUSCH field for the antenna port groups corresponding to different beams to complete the accumulation reset. However, there is an obvious problem with this method. When the UE is configured with multiple antenna port groups at the same time, and the switching between multiple antenna groups is frequent, the above-mentioned independent accumulation reset based on each antenna port group brings great complexity to the uplink power control, and results in a problem of frequent reset.

In view of the above problem, the present disclosure provides a solution. It should be noted that, the embodiments of the present disclosure and the features of the embodiments may be arbitrarily combined with each other. For example, the embodiments in the user equipment (UE) and the features in the embodiments of the present disclosure can be applied to the base station, and vice versa.

The present disclosure provides a method for power adjustment in a user equipment (UE), comprising:
  receiving first information, the first information being used to trigger a first operation;
  receiving K piece(s) of target information; and
  transmitting a first wireless signal;
  wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is used to determine the first power value; the K power offset value(s) are respectively indicated by the K piece(s) of target information; the first information is used to determine P antenna port groups; the first power value is associated with a first antenna port group; the antenna port groups comprise a positive integer number of antenna ports; the P is a positive integer; the K is a positive integer.

In the embodiment, the K power offset value(s) corresponds(correspond) to the K Transmission power value Control (TPC) indication(s) after the first operation is triggered. An accumulation reset corresponding to the first power value is triggered by reception of the first information. The first information corresponds to the P antenna port group(s), rather than the first antenna port group corresponding to the first wireless signal. The accumulation reset of the first power value is triggered only when the P antenna port group(s) is(are) reset. Therefore, the frequent reset of the uplink transmitting power due to the change of the corresponding antenna port group is avoided, and the complexity of the uplink power control of the UE is reduced.

In the embodiment, one of the advantages of the above method is that the large-scale fading corresponding to the P antenna port groups is similar. The uplink power control of the UE is operated by referring to the average pathloss value(s) (Pathloss) of the wireless signal s transmitted by the P antenna port groups, thereby simplifying the power control complexity.

In the embodiment, another benefit of the above method is that the method in the present disclosure avoids the occurrence of the following problems. Under large-scale MIMO, a scenario in which the UE frequently switches the first antenna port group in the P antenna port group(s) exists. If the uplink transmitting power is determined only by the first antenna port group corresponding to the first wireless signal, the uplink transmitting power will vary greatly and is unstable, which is disadvantageous for receiving by the base station.

In one embodiment, the P is greater than 1.

In one embodiment, the P is 1.

In one embodiment, the given target information is the first target information received by the UE after the triggering of the first operation. The given target information is one of the K piece(s) of target information that is first received by the UE.

In one embodiment, the phrase that the first power value is irrelevant to all piece(s) of target information received prior to triggering the first operation means: the UE receives K1 pieces of target information in a given time window, and the time when the first operation is triggered corresponds to a first time. The given time window includes the first time. Among the K1 pieces of target information, K2 piece(s) of target information is(are) before the first time, and K piece (s) of target information is(are) after the first time. The K1 is equal to the sum of the K2 and the K. The first power value is irrelevant to the K2 piece(s) of target information.

In one embodiment, the first information is semi-persistently configured.

In one embodiment, the first information is dynamically configured.

In one embodiment, the first antenna port group is one of the P antenna port group(s).

In one embodiment, the antenna port groups include only one antenna port.

In one embodiment, the antenna port group includes a positive integer number of the antenna port(s).

In one embodiment, the P is greater than 1. There are at least two antenna port groups in the P antenna port groups, and the numbers of the antenna ports in the two antenna port groups are unequal.

In one embodiment, the first antenna port group is any one of the P antenna port groups.

In one embodiment, that the first power value is associated with a first antenna port group means that: measurements for all of the antenna ports in the first antenna port group are used to determine the first power value.

In one embodiment, that the first power value is associated with a first antenna port group means that: measurements for a part of the antenna ports in the first antenna port group are used to determine the first power value.

In one embodiment, the antenna port is formed by superposing multiple antennas through antenna virtualization. The mapping coefficients of the plurality of antennas to the antenna port constitute a beamforming vector.

In one sub-embodiment of this embodiment, the beamforming vectors corresponding to any two different antenna ports cannot be assumed to be the same.

In one sub-embodiment of this embodiment, the UE cannot perform joint channel estimation using the reference signals transmitted by two different antenna ports.

In one embodiment, the first operation is re-triggered after the K piece(s) of target information.

In one embodiment, the first operation is applied to the P antenna port group(s).

In one embodiment, a Reference Signal (RS) transmitted by the antenna port is a Channel State Information Reference Signal (CSI-RS).

In one embodiment, the first antenna port and the second antenna port belong to any two of the antenna port groups respectively. The air interface resources respectively occupied by the RS transmitted by the first antenna port and by the RS transmitted by the second antenna port are orthogonal. The air interface resource includes one or more of time domain resource, frequency domain resource, and code domain resource.

In one sub-embodiment of this embodiment, the air interface resource is a time domain resource.

In one embodiment, the target information is a Transmitting Power Control (TPC) field.

In one embodiment, the target information is indicated by Downlink Control Information (DCI), and the DCI format corresponding to the DCI is one of the formats 0, 3, 3A, or 6-0A.

In one embodiment, the first information is a Radio Resource Control (RRC) layer signaling.

In one embodiment, the first power value and the sum of K power offset(s) is a linear relationship.

In one sub-embodiment of this embodiment, a linear coefficient corresponding to the linear relationship is 1.

In one sub-embodiment of this embodiment, the unit of the power offset is dB (decibel).

In one sub-embodiment of this embodiment, the power offset is equal to one of −4, −1, 0, 1, 3, and 4.

In one embodiment, the first information belongs to UplinkPowerControl IE.

In one embodiment of the method for power adjustment in a user equipment, the method further comprises:
receiving Q target wireless signals; and
determining Q reference power values;
wherein the Q target wireless signals are respectively transmitted by Q antenna port groups; the P antenna port group(s) is(are) a subset of the Q antenna port groups; measurements for the Q target wireless signals are respectively used to determine the Q reference power values; the first antenna port group is one of the Q antenna port groups; the Q is a positive integer greater than 1; the Q is greater than or equal to the P.

In the embodiment, the UE is configured with Q antenna port groups. The Q antenna port groups correspond to the Q target wireless signals. The accumulation reset of the first power value is triggered when the P antenna port group(s) of the Q antenna port groups is(are) reconfigured. This embodiment reduces the number of triggers for the accumulation reset of the UE, thereby reducing the complexity of the power control.

In one embodiment, the P is smaller than the Q.

In one embodiment, the P is equal to the Q.

In one sub-embodiment of this embodiment, the P antenna port groups are equal to the Q antenna port groups.

In one embodiment, the target wireless signal includes a positive integer number of reference signal(s). The number of the reference signals in the target wireless signal is equal to the number of the antenna ports in the corresponding antenna port group.

In one sub-embodiment of the embodiment, the reference signals in the target wireless signal and the antenna ports in the corresponding antenna port group are in one-to-one correspondence.

In one embodiment, the first antenna port group is one other than the P antenna port group(s).

In the sub-embodiment of the embodiment, even if the antenna port group determined by the first information is irrelevant to the first antenna port group, the first power value associated with the first antenna port group still needs to trigger an accumulation reset.

In one embodiment, the first antenna port group is one of the P antenna port group(s).

In the sub-embodiment of the embodiment, only when the antenna port group determined by the first information is irrelevant to the first antenna port group, the first power value associated with the first antenna port group needs to trigger an accumulation reset.

In one embodiment, the first information further includes an index of the P antenna port group(s) in the Q antenna port groups.

In one embodiment, the first power value is one of the Q reference power values.

In one embodiment, the Q reference power values are for the same time window.

In one embodiment, the Q reference power values are for different time windows.

In one embodiment, the target wireless signal comprises a CSI-RS.

In one embodiment, the unit of the reference power value is one of dBm (millimeters), dB, or mW (milliwatts).

In one embodiment, the given reference power value is one of the Q reference power values. The given reference power value is associated with a given antenna port group. The given antenna port group is associated with the given reference power value of the Q antenna port groups.

In one sub-embodiment of this embodiment, whether the given reference power value is equal to min$\{P_{CMAX,c}(i), P_1(i)\}$ or the given reference power value is equal to a difference between $P_{CMAX,c}(i)$ and $P_1(i)$. $P_1(i)$ is determined by the following formula:

$$P_1(i)=10\log_{10}(M_{PUSCH,c}(i))+P_{O\_PUSCH,c}(j)+PL'+\Delta_{TF,c}(i)+f_c(i)$$

wherein i represents a subframe number or a slot number; the value of j is related to the type of the wireless signal using the given reference power value. $P_{CMAX,c}(i)$ corresponds to the maximum transmitting power of the wireless signal using the given reference power value. $M_{PUSCH,c}(i)$ is related to the bandwidth occupied by the wireless signal using the given reference power value. $P_{CMAX,c}(i)$ and $M_{PUSCH,c}(i)$ are configured by a higher layer signaling. $P_{O\_PUSCH,c}(j)$ is configured by a higher layer signaling. $f_c(i)$ is associated with a higher layer signaling and indicated by TPC. PL' is associated with the pathloss values of the Q target wireless signals to the UE.

In one additional embodiment of this sub-embodiment, the given reference power value is equal to min$\{P_{CMAX,c}(i), P_1(i)\}$. The given reference power value is the transmitting power of the corresponding wireless signal.

In one additional embodiment of this sub-embodiment, PL' is determined by the following formula:

$$PL' = \frac{\alpha_c(j)}{Q} \cdot \sum_{l=1}^{Q} PL(l)$$

PL(l) corresponds to the pathloss value of the l-th target wireless signal in the Q target wireless signals to the UE. The "l" is a positive integer not less than 1 and not greater than Q. When j is equal to 0 or 1, $\alpha_c(j)$ is configured by the high-level signaling, or when j is equal to 2, $\alpha_c(j)$ is equal to 1. $\alpha_c(j)$ is irrevernt to the l-th target wireless signal.

In one additional embodiment of this sub-embodiment, PL' is determined by the following formula:

$$PL' = \frac{1}{Q} \cdot \sum_{l=1}^{Q} \alpha_{c,l}(j) PL(l)$$

PL(l) corresponds to the pathloss value of the l-th target wireless signal in the Q target wireless signals to the UE. The "l" is a positive integer not less than 1 and not greater than Q. When j is equal to 0 or 1, $\alpha_{c,l}(j)$ is configured by the high-level signaling, or when j is equal to 2, $\alpha_{c,l}(j)$ is equal to 1. $\alpha_{c,l}(j)$ is associated the l-th target wireless signal.

In one auxiliary embodiment of this sub-embodiment, the wireless signal using the given reference power value is an uplink data channel through semi-persistent grant, and the j is equal to 0; the wireless signal using the given reference power value is an uplink data channel through dynamic scheduled grant, and the j is equal to 0; the wireless signal using the given reference power value is used for initial access, and the j is equal to 2.

In one embodiment of the method for power adjustment in a user equipment, the method further comprises:

receiving K downlink signaling(s);
wherein the K downlink signaling(s) respectively comprises the K piece(s) of target information; a first signaling is the last received one among the K downlink signaling(s); the first signaling comprises scheduling information of the first wireless signal; the scheduling information comprises at least one of occupied time domain resources, occupied frequency domain resources, Modulation and Coding Status (MCS), New Data Indicator (NDI), Redundancy Version (RV), or Hybrid Automatic Repeat request (HARD) process numbers.

In the embodiment, the downlink signaling is also used for uplink scheduling while including the target information, thereby saving control signaling overhead.

In one embodiment, the downlink signaling is a DCI.

In one sub-embodiment of the embodiment, the DCI corresponding to the downlink signaling adopts Format 0, or the DCI corresponding to the downlink signaling adopts Format 6-0A.

In one embodiment, the downlink signaling is a dynamic signaling.

In one embodiment, any two downlink signalings in the K downlink signalings occupy different time domain resources.

In one sub-embodiment of this embodiment, the downlink signaling is a DCI for uplink grant (UL Grant).

In one embodiment, the downlink signaling is used to determine an index of the first antenna port group in the Q antenna port groups.

In one sub-embodiment of the embodiment, the downlink signaling includes Q1 bit(s). The Q1 bits indicates(indicate) an index of the first antenna port group in the Q antenna port groups. The Q1 is a positive integer.

In one sub-embodiment of the embodiment, the downlink signaling is identified by a first identity (ID). The index of the first antenna port group in the Q antenna port group is used to generate the first ID.

In one embodiment, the downlink signaling is identified by the first ID.

In one sub-embodiment of this embodiment, a Cyclic Redundancy Check (CRC) bit in the downlink signaling is scrambled by the first ID.

In one sub-embodiment of the embodiment, the first ID is a Radio Network Temporary Identity (RNTI).

In one sub-embodiment of the embodiment, the first ID is used to determine a time-frequency resource occupied by the downlink signaling.

In one embodiment of the method for power adjustment in a user equipment, the first wireless signal comprises a first difference value; the first difference value is a difference between a first limited power and a first reference power value; the first reference power value is linearly related to the sum of the K power offset(s); the first reference power value is linearly related to a reference pathloss value; the reference pathloss value is an average of P pathloss value(s), and the P pathloss value(s) is(are) in one-to-one correspondence with the P antenna port group(s), or the reference pathloss value is an average of Q pathloss values, and the Q pathloss values are in one-to-one correspondence with the Q antenna port groups.

In the embodiment, the pathloss value used in the power control corresponding to the first wireless signal is an average value, rather than the pathloss value(s) corresponding to the wireless signal transmitted by the first antenna port group corresponding to the first wireless signal. This embodiment simplifies the complexity of uplink power control and avoids frequent changes in uplink transmitting power.

In one embodiment, the unit of the first difference value is dB(decibel).

In one embodiment, the first difference value is a Power Headroom (PH).

In one embodiment, the first difference value is PH(i), which is determined by the following formula:

$$PH(i)=P_{CMAX,c}(i)-10\ \log_{10}(M_{PUSCH,c}(j))+P_{O\_PUSCH,c}(j)+PL'+\Delta_{TF,c}(i)+f_c(i)$$

wherein the i represents a subframe or a slot number, and the value of j is associated with the type of the first wireless signal. $P_{CMAX,c}(i)$ corresponds to the first limited power. $M_{PUSCH,c}(i)$ is associated with the bandwidth occupied by the first wireless signal, and configured by a high layer signaling. $P_{O\_PUSCH,c}(j)$ is configured by a high layer signaling. $\Delta_{TF,c}(i)$ is associated with a high layer signaling. $f_c(i)$ is associated with a dynamic signaling, and is indicated by TPC. PL' is associated with the reference pathloss value.

In one sub-embodiment of this embodiment, PL' is determined by the following formula:

$$PL'=\alpha_c(j)PL_A$$

wherein when j is equal to 0 or 1, $\alpha_c(j)$ is configured by a high layer signaling; or when j is equal to 2, $\alpha_c(j)$ is equal to 1. $\alpha_c(j)$ is irrelevant to the first wireless signal. $PL_A$ corresponds to the average of the P pathloss value(s), or $PL_A$ corresponds to the average of the Q path loses.

In one embodiment, the first wireless signal further includes upper layer data.

In one embodiment of the method for power adjustment in a user equipment, the first information comprises P sub-information block(s); the P sub-information block(s) is(are) in one-to-one correspondence with the P antenna port group(s); the sub-information block(s) indicates(indicate) at least one of an index of the corresponding antenna port group or a parameter set of the corresponding antenna port group; the parameter set is used to determine the corresponding reference power value.

In one embodiment, the P sub-information block(s) respectively comprises(comprise) compensation factor(s) of the P pathloss value(s). The compensation factor(s) of the P pathloss value(s) is(are) in one-to-one correspondence with the wireless signal(s) transmitted on the P antenna port group(s).

In one embodiment, the parameter set includes a compensation factor for pathloss value. A linear coefficient between the corresponding reference power value and the pathloss value is the compensation factor.

In one embodiment, the first information includes only one compensation factor for pathloss value. The compensation factor for pathloss value is for a wireless signal transmitted on any one of the P antenna port group(s). A linear coefficient between the corresponding reference power value and the reference pathloss value is the compensation factor. The reference pathloss value is an average of P pathloss value(s) corresponding to the P antenna port group(s).

In one embodiment, the P sub-information block(s) respectively comprises(comprise) P type-one desired power(s). The P type-one desired power(s) is(are) in one-to-one correspondence with the P antenna port group(s).

In one sub-embodiment of this embodiment, the type-one desired power is exclusive to the antenna port group; or the type-one desired power is beam-specific; or the type-one desired power is beam group-specific.

In one sub-embodiment of this embodiment, the linear coefficient between the corresponding reference power value and the type-one desired power is 1.

In one embodiment, the parameter set includes one type-one desired power. The corresponding reference power value is linearly related to the type-one desired power.

In one sub-embodiment of this embodiment, the linear coefficient between the corresponding reference power value and the type-one desired power is 1.

In one embodiment, the first information block includes only one type-two desired power. The type-two desired power is irrelevant to any one of the P antenna port group(s).

In one sub-embodiment of this embodiment, the type-two desired power is UE-specific.

In one sub-embodiment of this embodiment, the type-two desired power is cell-specific.

In one sub-embodiment of this embodiment, the linear coefficient between the corresponding reference power value and the type-two desired power is 1.

In one embodiment of the method for power adjustment in a user equipment, the method further comprises:
  receiving second information;
  wherein the second information is used to determine a first desired power; the second information is received prior to triggering the first operation; the first desired power is used to determine the first power value.

In the embodiment, the first desired power is non-beam-specific or non-antenna-port-group-specific or non-beam-group-specific. And the difference from the existing system is that the second information is not used for the accumulation reset trigger of the first power value.

In one embodiment, the second information is a p0-UE-PUSCH field.

In one embodiment, the first power value is linearly related to the first desired power, and the corresponding linear coefficient is 1.

In one embodiment, the second information belongs to the first information, and the first desired power corresponds to the type-two desired power.

In one sub-embodiment of this embodiment, the first desired power is irrelevant to any one of the P antenna port group(s).

In one sub-embodiment of this embodiment, the first desired power is UE-specific.

In one sub-embodiment of this embodiment, the first desired power is cell-specific.

The present disclosure provides a method for power adjustment in a base station, comprising:
  transmitting first information, the first information being used to trigger a first operation;
  transmitting K piece(s) of target information; and
  receiving a first wireless signal;
  wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is used to determine the first power value; the K power offset value(s) is(are) respectively indicated by the K piece(s) of target information; the first information is used to determine P antenna port group(s); the first power value is associated with a first antenna port group; the antenna port group(s) comprises(comprise) a positive integer number of antenna port(s); the P is a positive integer; the K is a positive integer.

In one embodiment of the method for power adjustment in a base station, the method further comprises:
transmitting Q target wireless signals; and
determining Q reference power values;
wherein the Q target wireless signals are respectively transmitted by Q antenna port groups; the P antenna port group(s) is(are) a subset of the Q antenna port groups; measurements for the Q target wireless signals are respectively used to determine the Q reference power values; the first antenna port group is one of the Q antenna port groups; the Q is a positive integer greater than 1; the Q is greater than or equal to the P.

In one embodiment, the Q reference power values are respectively used to determine Q receiving powers. The Q receiving powers are respectively in one-to-one correspondence with Q transmitting antenna port groups. The Q transmitting antenna port groups are in one-to-one correspondence with the Q antenna port groups.

In one sub-embodiment of this embodiment, there is a given reference power value among the Q reference power values, and the given reference power value is used to determine the first power value.

In one embodiment of the method for power adjustment in a base station, the method further comprises:
transmitting K downlink signaling(s);
wherein the K downlink signaling(s) respectively comprises the K piece(s) of target information; a first signaling is the last received one among the K downlink signaling(s); the first signaling comprises scheduling information of the first wireless signal; the scheduling information comprises at least one of occupied time domain resources, occupied frequency domain resources, MCS, HARQ process numbers, RV, or NDI.

In one embodiment of the method for power adjustment in a base station, the first wireless signal comprises a first difference value; the first difference value is a difference between a first limited power and a first reference power value; the first reference power value is linearly related to the sum of the K power offset(s); the first reference power value is linearly related to a reference pathloss value; the reference pathloss value is an average of P pathloss value(s), and the P pathloss value(s) is(are) in one-to-one correspondence with the P antenna port group(s), or the reference pathloss value is an average of Q pathloss values, and the Q pathloss values are in one-to-one correspondence with the Q antenna port groups.

In one embodiment of the method for power adjustment in a base station, the first information comprises P sub-information block(s); the P sub-information block(s) is(are) in one-to-one correspondence with the P antenna port group(s); the sub-information block(s) indicates(indicate) at least one of an index of the corresponding antenna port group or a parameter set of the corresponding antenna port group; the parameter set is used to determine the corresponding reference power value.

In one embodiment of the method for power adjustment in a base station, the method further comprises:
transmitting second information;
wherein the second information is used to determine a first desired power; the second information is received prior to triggering the first operation; the first desired power is used to determine the first power value.

In one embodiment of the method for power adjustment in a base station, the second information includes the first information; or the third information includes the first information.

The present disclosure provides a user equipment for power adjustment, comprising:
a first receiver, receiving first information, the first information being used to trigger a first operation;
a second receiver, receiving K piece(s) of target information; and
a first transmitter, transmitting a first wireless signal;
wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is used to determine the first power value; the K power offset value(s) are respectively indicated by the K piece(s) of target information; the first information is used to determine P antenna port group(s); the first power value is associated with a first antenna port group; the antenna port group(s) comprises(comprise) a positive integer number of antenna port(s); the P is a positive integer; the K is a positive integer.

In one embodiment, the first receiver further receives the Q target wireless signals for determining Q reference power values. The Q target wireless signals are respectively transmitted by Q antenna port groups, and the P antenna port group(s) is(are) a subset of the Q antenna port groups. Measurements for the Q target wireless signals are used to determine the Q reference power values respectively. The first antenna port group is one of the Q antenna port groups. The Q is a positive integer greater than 1, and the Q is greater than or equal to the P.

In one embodiment, the first receiver further receives second information, wherein the second information is used to determine a first desired power; the second information is received prior to triggering the first operation; the first desired power is used to determine the first power value.

In one embodiment, the second receiver further receives K downlink signaling(s); wherein the K downlink signaling(s) respectively comprises(comprise) the K piece(s) of target information; a first signaling is the last received one among the K downlink signaling(s); the first signaling comprises scheduling information of the first wireless signal; the scheduling information comprises at least one of occupied time domain resources, occupied frequency domain resources, MCS, HARQ process numbers, RV, or NDI.

In one embodiment of a user equipment for power adjustment, the first wireless signal comprises a first difference value; the first difference value is a difference between a first limited power and a first reference power value; the first reference power value is linearly related to the sum of the K power offset(s); the first reference power value is linearly related to a reference pathloss value; the reference pathloss value is an average of P pathloss value(s), and the P pathloss value(s) is(are) in one-to-one correspondence with the P antenna port group(s), or the reference pathloss value is an average of Q pathloss values, and the Q pathloss values are in one-to-one correspondence with the Q antenna port groups.

In one embodiment of a user equipment for power adjustment, the first information comprises P sub-information block(s); the P sub-information block(s) is(are) in one-to-one correspondence with the P antenna port group(s); the sub-information block(s) indicates(indicate) at least one of an index of the corresponding antenna port group or a parameter set of the corresponding antenna port group; the parameter set is used to determine the corresponding reference power value.

The present disclosure provides a base station for power adjustment, comprising:
- a second transmitter, transmitting first information, the first information being used to trigger a first operation;
- a third transmitter, transmitting K piece(s) of target information; and
- a third receiver, receiving a first wireless signal;
- wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is used to determine the first power value; the K power offset value(s) are respectively indicated by the K piece(s) of target information; the first information is used to determine P antenna port group(s); the first power value is associated with a first antenna port group; the antenna port group(s) comprises(comprise) a positive integer number of antenna port(s); the P is a positive integer; the K is a positive integer.

In one embodiment, the second transmitter further transmits the Q target wireless signals for determining Q reference power value. The Q target wireless signals are respectively transmitted by Q antenna port groups, and the P antenna port group(s) is(are) a subset of the Q antenna port groups. Measurements for the Q target wireless signals are used to determine the Q reference power values respectively. The first antenna port group is one of the Q antenna port groups. The Q is a positive integer greater than 1, and the Q is greater than or equal to the P.

In one embodiment, the second transmitter further transmits second information; wherein the second information is used to determine a first desired power; the second information is received prior to triggering the first operation; the first desired power is used to determine the first power value.

In one embodiment, the third transmitter transmits K downlink signaling(s); wherein the K downlink signaling(s) respectively comprises(comprise) the K piece(s) of target information; a first signaling is the last received one among the K downlink signaling(s); the first signaling comprises scheduling information of the first wireless signal; the scheduling information comprises at least one of occupied time domain resources, occupied frequency domain resources, MCS, HARQ process numbers, RV, or NDI.

In one embodiment of a base station for power adjustment, the first wireless signal comprises a first difference value; the first difference value is a difference between a first limited power and a first reference power value; the first reference power value is linearly related to the sum of the K power offset(s); the first reference power value is linearly related to a reference pathloss value; the reference pathloss value is an average of P pathloss value(s), and the P pathloss value(s) is(are) in one-to-one correspondence with the P antenna port group(s), or the reference pathloss value is an average of Q pathloss values, and the Q pathloss values are in one-to-one correspondence with the Q antenna port groups.

In one embodiment of a base station for power adjustment, the first information comprises P sub-information block(s); the P sub-information block(s) is(are) in one-to-one correspondence with the P antenna port group(s); the sub-information block(s) indicates(indicate) at least one of an index of the corresponding antenna port group or a parameter set of the corresponding antenna port group; the parameter set is used to determine the corresponding reference power value.

Compared with the prior art, the present disclosure has the following technical advantages:

The K power offset value(s) corresponds(correspond) to the K transmission power value Control (TPC) indication(s) after the first operation is triggered. An accumulation reset corresponding to the first power value is triggered by reception of the first information. The first information corresponds to the P antenna port group(s) rather than the first antenna port group corresponding to the first wireless signal. The accumulation reset of the first power value is triggered only when the P antenna port groups are reset. The frequent reset of the uplink transmitting power due to the change of the corresponding antenna port group is avoided, and the complexity of the uplink power control of the UE is reduced.

The large-scale fading corresponding to the P antenna port group(s) is similar. The uplink power control of the UE is operated by referring to the average pathloss value9 (Pathloss) of the wireless signals transmitted by the P antenna port group(s), thereby simplifying the power control complexity.

Under large-scale MIMO, a scenario in which the UE frequently switches the first antenna port group in the P antenna port group(s) exists. If the uplink transmitting power is determined only by the first antenna port group corresponding to the first wireless signal, the uplink transmitting power will vary greatly and is unstable, which is disadvantageous for receiving by the base station. The method in the present disclosure avoids the occurrence of the above problem.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

The embodiments of the present disclosure will be further described in detail below with reference to the accompanying drawings, and it should be noted that the features in the embodiments and the embodiments of the present disclosure may be combined with each other without conflict.

Embodiment 1

Figure 1:
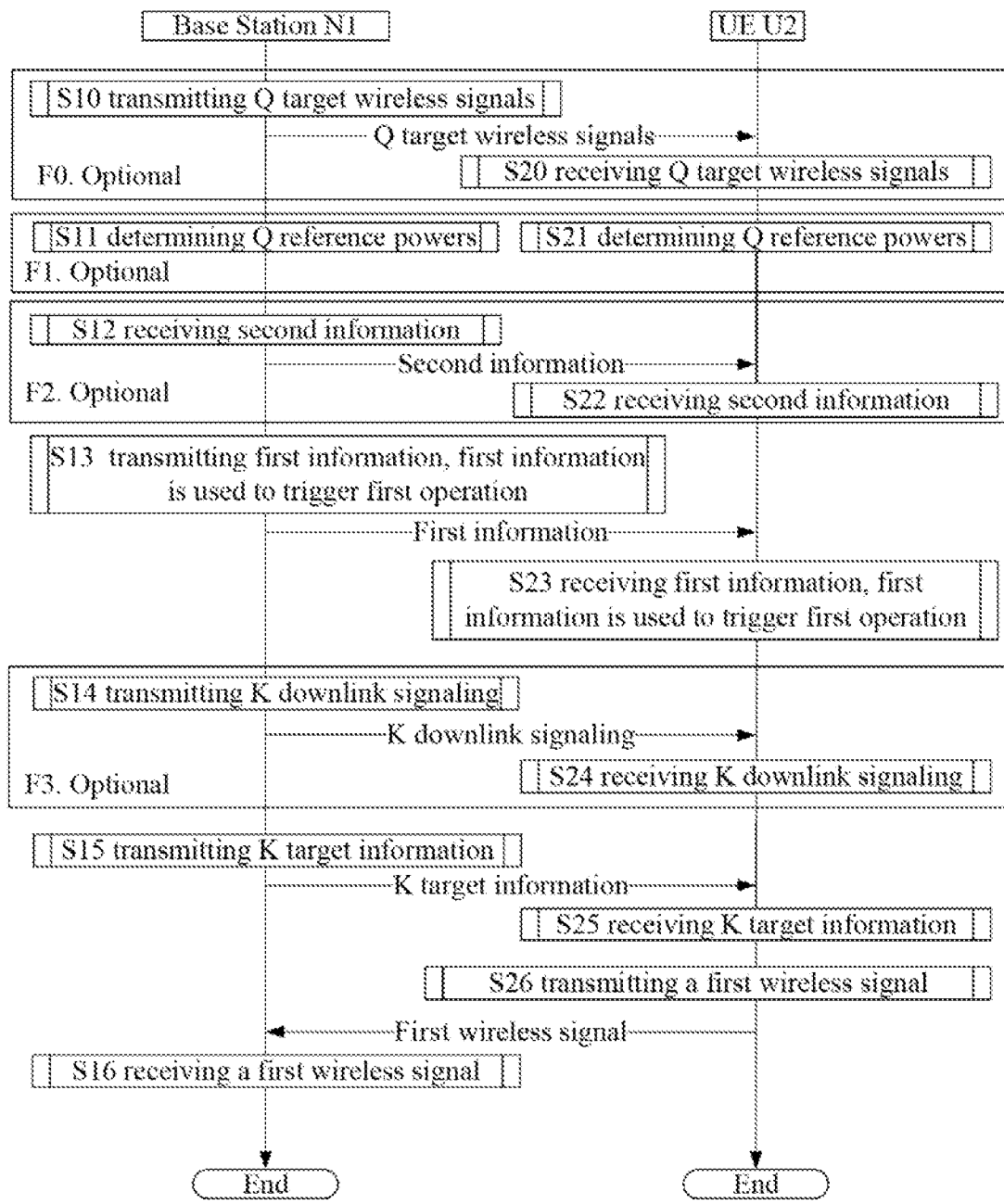
FIG. 1 shows a flow chart showing a first information transmission in accordance with an embodiment of the present disclosure.

Embodiment 1 Illustrates a flow chart showing a first information transmission in accordance with an embodiment of the present disclosure, as shown in FIG. 1. In FIG. 1, the base station N1 is a maintenance base station for the serving cell of the UE U2. The steps identified by block F0, block F1, block F2 and block F3 are optional, respectively.

For the base station N1, Q target wireless signals are transmitted in step S10; Q reference power values are determined in step S11; the second information is transmitted in step S12; the first information is transmitted in step S13, and the first is used to trigger the first operation; K downlink signalings are transmitted in step S14; K piece(s) of target information is(are) transmitted in step S15; the first wireless signal is received in step S16.

For the UE U2, the Q target wireless signals are received in step S20; the Q reference power values are determined in step S21; the second information is received in step S22; the first information is received in step S23, and the first information is used to trigger the first operation; K downlink signaling(s) is(are) received in step S24; K piece(s) of target information is(are) received in step S25; the first wireless signal is transmitted in step S26.

In Embodiment 1, a transmission power value of the first wireless signal is a first power value. The first power value is irrelevant to all piece(s) of target information received prior to triggering the first operation. The K piece(s) of target information is(are) received after triggering the first operation. The sum of K power offset value(s) is used to determine the first power value. The K power offset value(s) is(are) respectively indicated by the K piece(s) of target information. The first information is used to determine P antenna port group(s). The first power value is associated with a first antenna port group. The antenna port groups comprise a positive integer number of antenna port(s). The P is a positive integer. The K is a positive integer. The Q target wireless signals are respectively transmitted by Q antenna port groups. The P antenna port group(s) is(are) a subset of the Q antenna port groups. Measurements for the Q target wireless signals are respectively used to determine the Q reference power values. The first antenna port group is one of the Q antenna port groups. The Q is a positive integer greater than 1. The Q is greater than or equal to the P. The K downlink signaling(s) respectively comprises the K piece(s) of target information. A first signaling is the last received one among the K downlink signaling(s). The first signaling comprises scheduling information of the first wireless signal. The scheduling information comprises at least one of occupied time domain resources, occupied frequency domain resources, MCS, HARQ process numbers, RV, or NDI. The second information is used to determine a first desired power by the UE U2. The second information is received prior to triggering the first operation. The first desired power is used to determine the first power value.

In one sub-embodiment, the second information is an RRC signaling.

In one sub-embodiment, the second information is UE-specific.

In one sub-embodiment, the first information is an RRC signaling.

In one sub-embodiment, the first information is UE-specific.

In one sub-embodiment, the transport channel corresponding to the first wireless signal is an Uplink Shared Channel (UL-SCH).

In one sub-embodiment, the physical layer channel corresponding to the first wireless signal is a Physical Uplink Shared Channel (PUSCH), or a Short Latency PUSCH (sPUSCH).

Embodiment 2

Figure 2:
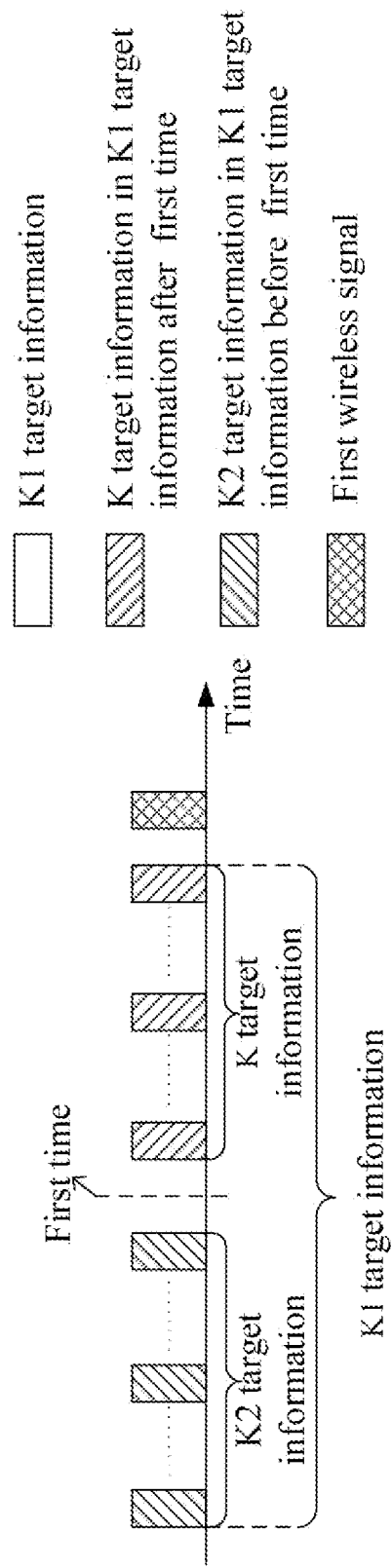
FIG. 2 shows time domain diagram for triggering a first operation in accordance with an embodiment of the present disclosure.

Embodiment 2 Illustrates a time domain diagram for triggering a first operation, as shown in FIG. 2. In FIG. 2, the square marked by the thick line frame is one of the target information of the K1 target information, the square filled with slashes is one of the K2 piece(s) of target information, and the square filled with backslashes is one of the K piece(s) of target information. The K1 pieces of target information is composed of the K2 piece(s) of target information and the K piece(s) of target information.

In Embodiment 2, in a given time window, the UE receives K1 pieces of target information in total, and the UE receives the first information at a first time. Among the K1 pieces of target information, K piece(s) of target information is(are) after the first time in the time domain. Among the K1 target information, K2 piece(s) of target information is before the first time in the time domain. The K1 is equal to the sum of the K and the K2. The first wireless signal of this disclosure is transmitted after the K piece(s) of target information.

In one sub-embodiment, the first time is considered by the UE to be the time when the first operation is triggered.

In one subsidiary embodiment of this sub-embodiment, the first power value of the present disclosure is irrelevant to the K2 piece(s) of target information.

In one subsidiary embodiment of this sub-embodiment, the first power value of the present disclosure is associated with the K piece(s) of target information.

In one subsidiary embodiment of the sub-embodiment, the first wireless signal of the present disclosure is the first uplink signal transmitted by the UE after the K piece(s) of target information.

In one example of this subsidiary embodiment, the uplink signal is used for random access, or the uplink signal is used for uplink data transmission.

Embodiment 3

Figure 3:
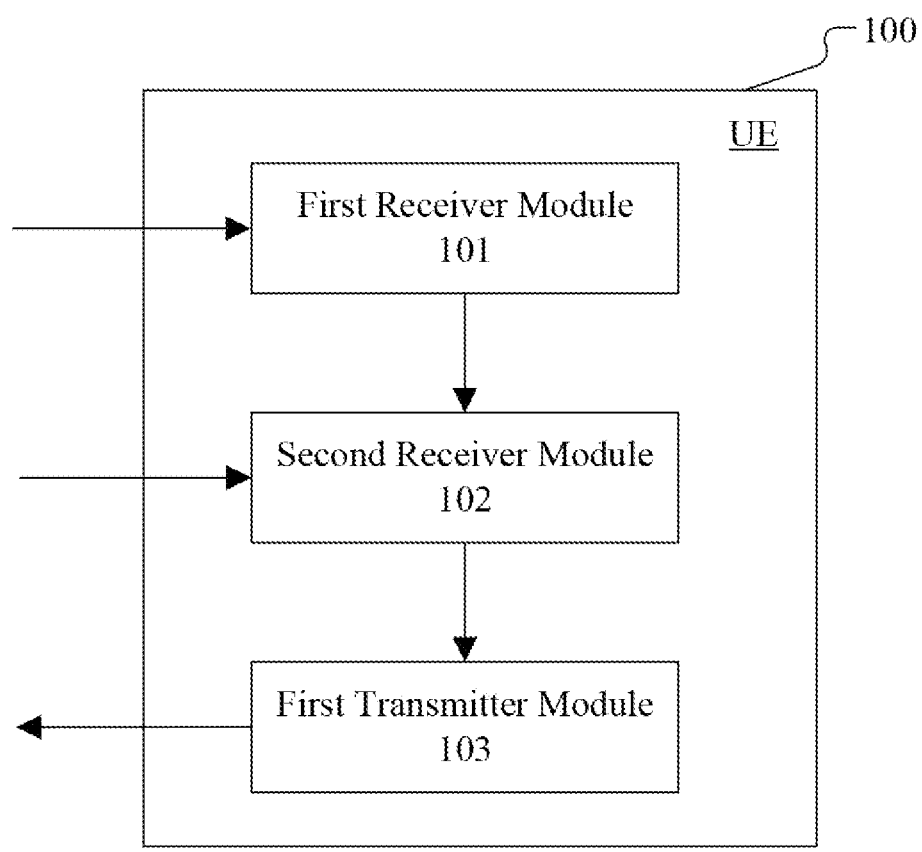
FIG. 3 shows a structural block diagram of a processing device in a UE according to an embodiment of the present disclosure.

Embodiment 3 Illustrates a structural block diagram of a processing device in a UE, as shown in FIG. 3. In FIG. 3, a processing device 100 in the UE comprises a first receiver 101, a second receiver 102 and a first transmitter 103.

The first receiver 101 is configured to receive first information; the first information being used to trigger a first operation.

The second receiver 102 is configured to receive K piece(s) of target information.

The first transmitter 103 is configured to transmit a first wireless signal.

In Embodiment 3, a transmission power value of the first wireless signal is a first power value. The first power value is irrelevant to all piece(s) of target information received prior to triggering the first operation. The K piece(s) of target information is(are) received after triggering the first operation. The sum of K power offset value(s) is used to determine the first power value. The K power offset value(s) is(are) respectively indicated by the K piece(s) of target information. The first information is used to determine P antenna port group(s). The first power value is associated with a first antenna port group. The antenna port groups comprise a positive integer number of antenna port(s). The P is a positive integer. The K is a positive integer.

In one sub-embodiment, the first receiver 101 is further configured to receive the Q target wireless signals for determining Q reference power values. The Q target wireless signals are respectively transmitted by Q antenna port groups, and the P antenna port group(s) is(are) a subset of the Q antenna port groups. Measurements for the Q target wireless signals are used to determine the Q reference power values respectively. The first antenna port group is one of the Q antenna port groups. The Q is a positive integer greater than 1, and the Q is greater than or equal to the P.

In one sub-embodiment, the first receiver 101 is further configured to receive second information. The second information is used to determine a first desired power. The second information is received prior to triggering the first operation. The first desired power is used to determine the first power value.

In one sub-embodiment, the second receiver 102 is further configured to receive K downlink signaling(s). The K downlink signaling(s) respectively comprises(comprise) the K piece(s) of target information. A first signaling is the last received one among the K downlink signaling(s). The first signaling comprises scheduling information of the first wireless signal. The scheduling information comprises at least one of occupied time domain resources, occupied frequency domain resources, MCS, HARQ process numbers, RV, or NDI.

Embodiment 4

Figure 4:
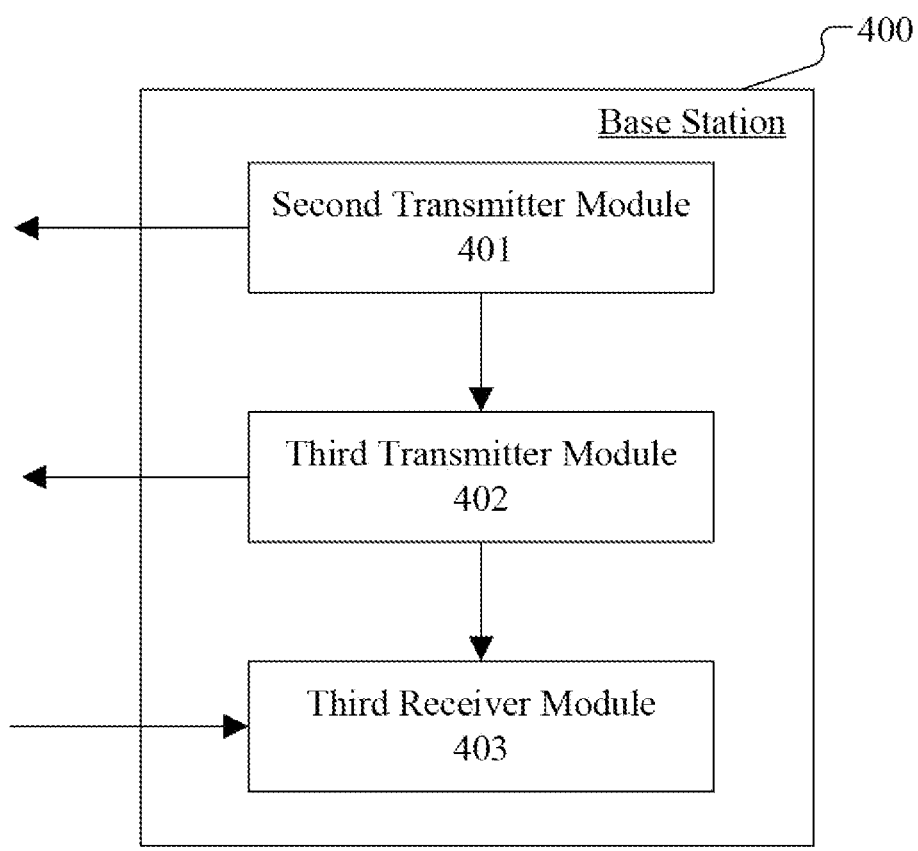
FIG. 4 shows a structural block diagram of a processing device in a base station according to an embodiment of the present disclosure.

Embodiment 4 Illustrates a structural block diagram of a processing device in a base station, as shown in FIG. 4. In FIG. 4, a processing device 400 in the base station comprises a second transmitter 401, a third transmitter 402 and a third receiver 403.

The second transmitter 401 is configured to transmit first information, the first information being used to trigger a first operation.

The third transmitter 402 is configured to transmit K piece(s) of target information.

The third receiver 403 is configured to receive a first wireless signal.

In Embodiment 4, a transmission power value of the first wireless signal is a first power value. The first power value is irrelevant to all piece(s) of target information received prior to triggering the first operation. The K piece(s) of target information is(are) received after triggering the first operation. The sum of K power offset value(s) is used to determine the first power value. The K power offset value(s) is(are) respectively indicated by the K piece(s) of target information. The first information is used to determine P antenna port group(s). The first power value is associated with a first antenna port group. The antenna port group(s) comprises (comprise) a positive integer number of antenna port(s). The P is a positive integer. The K is a positive integer.

In one sub-embodiment, the second transmitter 401 is further configured to transmit the Q target wireless signals for determining Q reference power values. The Q target wireless signals are respectively transmitted by Q antenna port groups, and the P antenna port group(s) is(are) a subset of the Q antenna port groups. Measurements for the Q target wireless signals are used to determine the Q reference power values respectively. The first antenna port group is one of the Q antenna port groups. The Q is a positive integer greater than 1, and the Q is greater than or equal to the P.

In one sub-embodiment, the second transmitter 401 is further configured to transmit second information. The second information is used to determine a first desired power. The second information is received prior to triggering the first operation. The first desired power is used to determine the first power value.

In one sub-embodiment, the third transmitter 402 is further configured to transmit K downlink signaling(s). The K downlink signaling(s) respectively comprises(comprise) the K piece(s) of target information. A first signaling is the last received one among the K downlink signaling(s). The first signaling comprises scheduling information of the first wireless signal. The scheduling information comprises at least one of occupied time domain resources, occupied frequency domain resources, MCS, HARQ process numbers, RV, or NDI.

Embodiment 5

Figure 5:
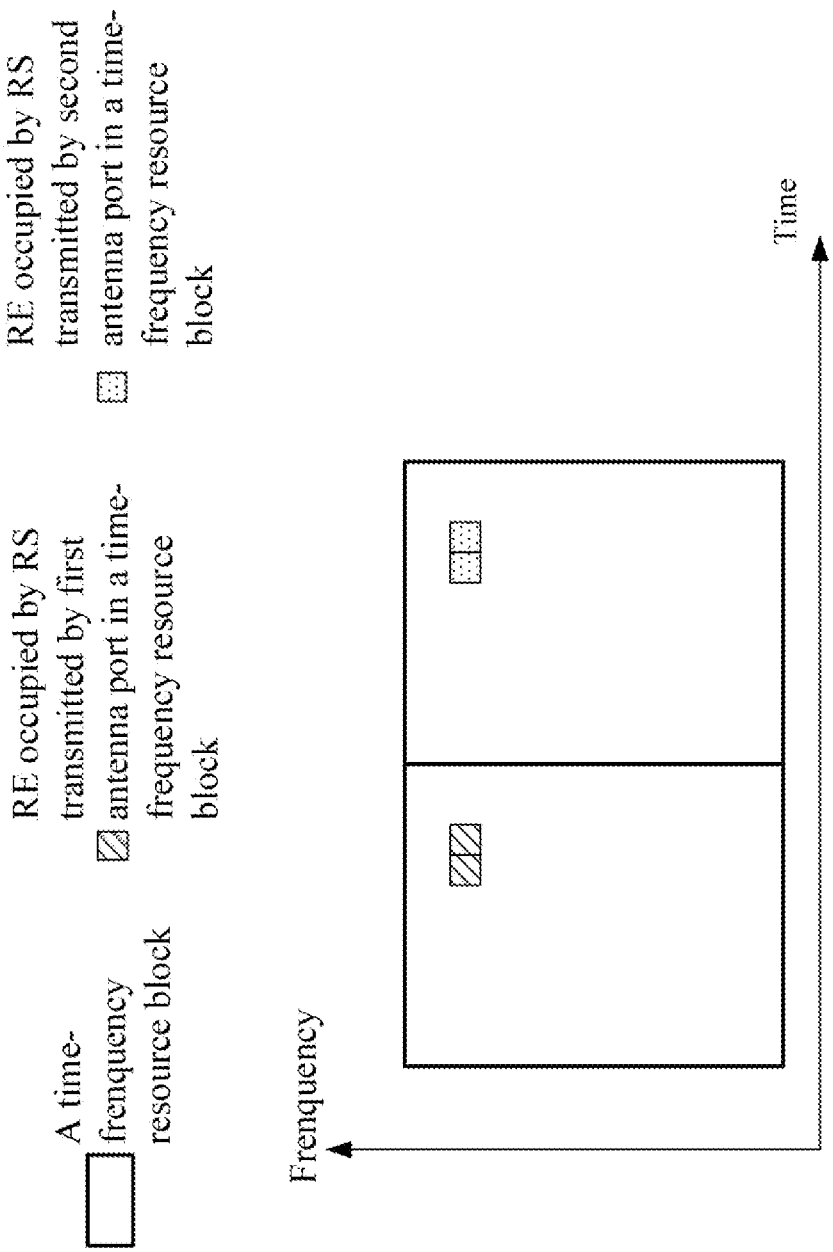
FIG. 5 shows a schematic diagram of a reference signal (RS) transmitted by an antenna port in a time-frequency resource block according to an embodiment of the present disclosure.

Embodiment 5 Illustrates a schematic diagram of a reference signal (RS) transmitted by an antenna port in a time-frequency resource block. In FIG. 5, the box marked by thick line frame is a time-frequency resource block, and the small square filled with slashes is the RE occupied by the RS transmitted by the first antenna port in one time-frequency resource block, and the small square filled with dots is the RE occupied by the RS transmitted by the second antenna port in a time-frequency resource block. The first antenna port and the second antenna port respectively belong to different antenna port groups in the present disclosure.

In one sub-embodiment 1 of Embodiment 5, the time-frequency resource block includes 12 subcarriers in the frequency domain.

In one sub-embodiment 2 of the Embodiment 5, the time-frequency resource block includes fourteen Orthogonal Frequency Division Multiplexing (OFDM) symbols in the time domain.

In one sub-embodiment 3 of Embodiment 5, the pattern of the RS transmitted by the first antenna port in the time-frequency resource block and the pattern of the RS transmitted by the second antenna port in the time-frequency resource block are the same.

In one sub-embodiment 4 of Embodiment 5, the time-frequency resource block is a Physical Resource Block (PRB), and a pattern of the RS transmitted by the first antenna port in the time-frequency resource block is the pattern of the CSI-RS in the PRB, and a pattern of the RS transmitted by the second antenna port in the time-frequency resource block is a pattern of the CSI-RS in the PRB.

In one sub-embodiment 5 of Embodiment 5, the antenna port groups of the present disclosure include only one antenna port.

Embodiment 6

Figure 6:
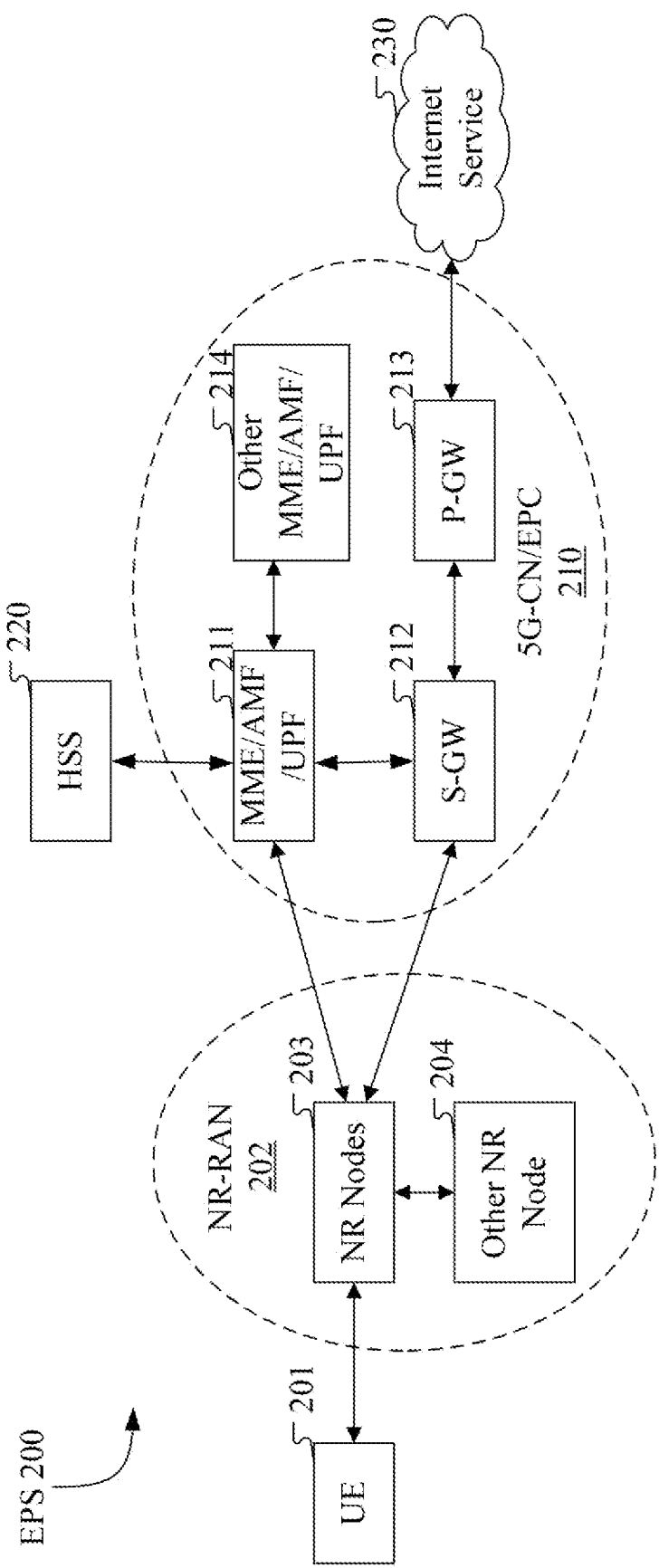
FIG. 6 shows a schematic diagram of a network architecture in accordance with one embodiment of the present disclosure.

Embodiment 6 Illustrates a schematic diagram of a network architecture, as shown in FIG. 6.

Embodiment 6 Illustrates a schematic diagram of a network architecture according to the present disclosure, as shown in FIG. 6. FIG. 6 illustrates a system network structure 200 of New Radio (NR), long-term evolution (LTE) and long-term evolution advanced (LTE-A). The network architecture 200 may be referred to one evolve packet system (EPS) 200 or some other suitable terminology. The EPS 200 may include one or more UEs 201, anNG-RAN 202, an Evolved Packet Core (EPC)/5G-Core Network(5G-CN) 210, a home subscriber server (HSS) 220 and an internet service 230. The EPS may be interconnected with other access networks, but for the sake of simplicity, these entities/interfaces are not shown. As shown in the figure, the EPS provides packet switching services. Those skilled in the art would readily appreciate that the various concepts presented throughout this disclosure can be extended to networks or other cellular networks that provide circuit switching services. The NG-RAN comprises an NR Node B (gNB) 203 and other gNBs 204. The gNB 203 provides user and control plane protocol terminations for the UE 201. The gNB 203 can be connected to other gNBs 204 via an Xn interface (e.g., a back haul). The gNB 203 may also be referred to as a base station, a base transceiver station, a radio base station, a radio transceiver, a transceiver function, a basic service set (BSS), an extended service set (ESS), a transmission and reception point (TRP), or some other suitable terminology. The gNB 203 provides the UE 201 with an access point to the EPC/5G-CN 210. In the embodiment, the UE 201 comprises cellular telephones, smart phones, Session Initiation Protocol (SIP) phones, laptop computers, personal digital assistants (PDAs), satellite radios, non-terrestrial base station communications, satellite mobile communications, global positioning systems, multimedia devices, video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a radio unit, a remote unit, a mobile device, a radio device, a radio communication device, a remote device, a mobile subscriber station, an access terminal, a mobile terminal, a radio terminal, remote terminal, handset, user agent, mobile client, client or some other suitable term. The gNB 203 is connected to the EPC/5G-CN 210 through an S1/NG interface. EPC/5G-CN 210 comprises an MME/AMF/UPF 211, other MMEs/AMFs/UPFs 214, a Service Gateway (S-GW) 212 and a Packet Date Network Gateway (P-GW) 213. The MME/AMF/UPF 211 is a control node that handles a signaling between the UE 201 and the EPC/5G-CN 210. In general, the MME/AMF/UPF 211 provides bearer and connection management. All User Internet Protocol (IP) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol service, and may specifically include the Internet, an intranet, an IP Multimedia Subsystem (IMS), and a PS streaming service (PSS).

In one sub-embodiment, the UE 201 corresponds to the user equipment in this disclosure.

In one sub-embodiment, the gNB 203 corresponds to the base station in the present disclosure.

In one sub-embodiment, the UE 201 supports massive multiple input and multiple output (Massive MIMO).

In one sub-embodiment, the gNB 20 supports massive multiple input and multiple output (Massive MIMO).

Embodiment 7

Figure 7:
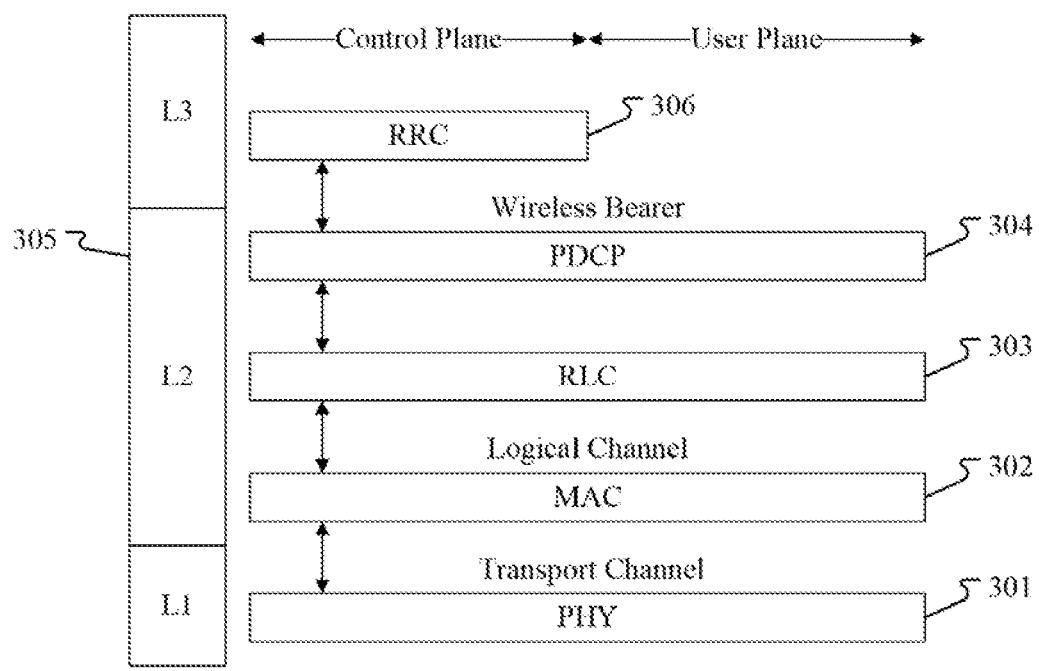
FIG. 7 shows a schematic diagram of a wireless protocol architecture of a user plane and a control plane according to an embodiment of the present disclosure.

Embodiment 7 illustrates a schematic diagram of a wireless protocol architecture of a user plane and a control plane according to an embodiment of the present disclosure, as shown in FIG. 7.

FIG. 7 is a schematic diagram illustrating an embodiment of a radio protocol architecture for a user plane and a control plane, and FIG. 7 illustrates a radio protocol architecture for the UE and the base station equipment (gNB or eNB) in three layers: layer 1, layer 2 and layer 3. Layer 1 (L1 layer) is the lowest layer and implements various physical layer (PHY) signal processing functions. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, including a network layer (e.g. an IP layer) terminated at the P-GW on the network side and an application layer (e.g. a remote UE, a server, etc.) terminated at the other side of the connection. The PDCP sub-layer 304 provides multiplexing between different radio bearers and logical channels. The PDCP sublayer 304 also provides header compression for upper layer packets to reduce radio transmission overhead, and provides security by encrypting packets, and provides support for UE handovers between gNBs. The RLC sublayer 303 provides segmentation and reassembly of upper layer packets, retransmission of lost packets and the reordering of packets to compensate for the disordered reception resulted from the hybrid automatic repeat request (HARQ). The MAC sublayer 302 provides multiplexing between the logical and transport channels. The MAC sublayer 302 is also responsible for allocating various radio resources (e.g. resource blocks) in one cell between UEs. The MAC sublayer 302 is also responsible for HARQ operations. In the control plane, the radio protocol architecture for the UE and gNB is substantially the same as the radio protocol architecture in the user plane for the physical layer 301 and the L2 layer 305, but there is no header compression function for the control plane. The control plane also comprises a Radio Resource Control (RRC) sublayer 306 on Layer 3 (L3 layer). The RRC sublayer 306 is responsible for obtaining radio resources (i.e. radio bearers) and configuring the lower layer using an RRC signaling between the gNB and the UE.

In one sub-embodiment, the wireless protocol architecture of FIG. 1 is applicable to the user equipment in this disclosure.

In one sub-embodiment, the wireless protocol architecture of FIG. 7 is applicable to the base station in this disclosure.

In one sub-embodiment, the K piece(s) of target information in the present disclosure is(are) generated by the PHY 301.

In one sub-embodiment, the K downlink signaling(s) in the present disclosure is(are) generated by the PHY 301.

In one sub-embodiment, the Q target wireless signals in the present disclosure are generated by the PHY 301.

In one sub-embodiment, the first information in the present disclosure is generated in the RRC sublayer 306.

In one sub-embodiment, the first wireless signal in the present disclosure is generated in the RRC sublayer 306.

In one sub-embodiment, the first wireless signal in the present disclosure is generated on the user plane.

In one sub-embodiment, the first wireless signal in the present disclosure is generated on the control plane.

Embodiment 8

Figure 8:
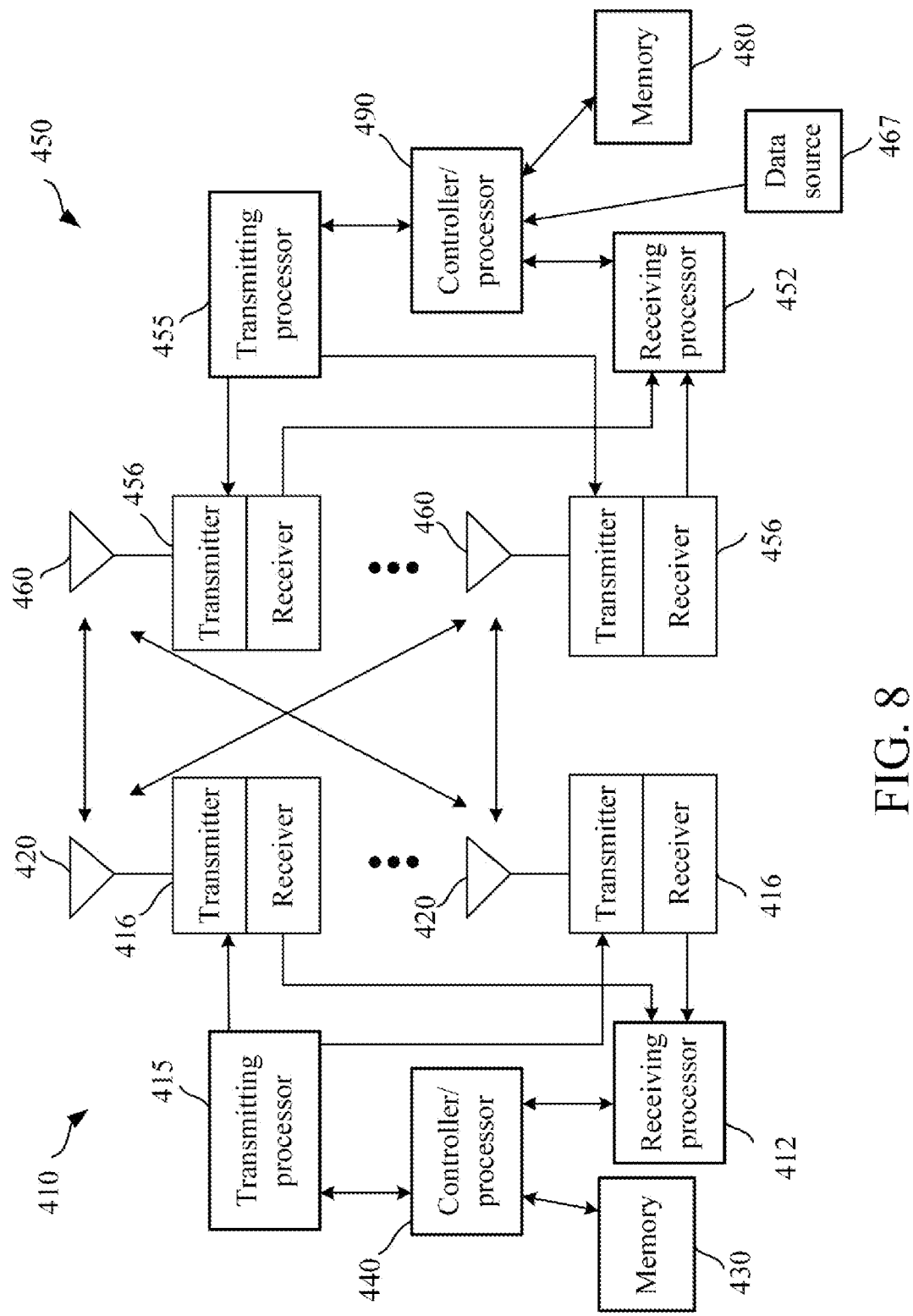
FIG. 8 shows a schematic diagram of a base station device and a user equipment according to an embodiment of the present disclosure.

Embodiment 8 shows a schematic diagram of a base station device and a user equipment according to the present disclosure, as shown in FIG. 8. FIG. 8 is a block diagram of a gNB 410 in communication with a UE 450 in an access network.

The user equipment (UE 450) comprises a controller/processor 490, a memory 480, a receiving processor 452, a transmitter/receiver 456, a transmitting processor 455 and a data source 467. The transmitter/receiver 456 includes an antenna 460. The data source 467 provides an upper layer data packet to the controller/processor 490. The controller/processor 490 provides header compression, encryption, packet segmentation and reordering, and multiplexing between logical and transport channels to implement L2 layer protocols for the user plane and the control plane. The upper layer packet may include data or control information, such as Uplink Shared Channel (UL-SCH). The transmitting processor 455 implements various signal transmission processing functions for the L1 layer (i.e., the physical layer), including encoding, interleaving, scrambling, modulation, power control/allocation, precoding, generation of physical layer control signaling, etc. The receiving processor 452 implements various signal transmission processing functions for the L1 layer (i.e., the physical layer), including decoding, deinterlacing, scrambling, modulation, de-precoding, extraction of physical layer control signaling, etc. The transmitter 456 is configured to convert the baseband signal provided by the transmitting processor 455 into a radio frequency signal and to transmit the radio frequency signal via the antenna 460. The receiver 456 is configured to convert the radio frequency signal received via the antenna 460 into a baseband signal and to provide the baseband signal to the receiving processor 452.

The base station (410) may include a controller/processor 440, a memory 430, a receiving processor 412, a transmitter/receiver 416, and a transmitting processor 415. The transmitter/receiver includes an antenna 420. The upper layer packet is provided to the controller/processor 440. The controller/processor 440 provides header compression, encryption and decryption, packet segmentation and reordering, and multiplexing between logical and transport channels to implement L2 layer protocols for the user plane and the control plane. The upper layer packet may include data or control information, such as a Downlink Shared Channel (DL-SCH) or an UpLink Shared Channel (UL-SCH). The transmitting processor 415 implements various signal transmission processing functions for the L1 layer (i.e., the physical layer), including encoding, interleaving, scrambling, modulation, power control/allocation, precoding, generation of physical layer control signaling, including Physical Broadcasting Channel (PBCH), Physical Downlink Control Channel (PDCCH), Physical Downlink Shared Channel (PDSCH)), etc. The receiving processor 412 implements various signal transmission processing functions for the L1 layer (i.e., the physical layer), including decoding, deinterlacing, scrambling, modulation, de-precoding, extraction of physical layer control signaling, etc. The transmitter 416 is configured to convert the baseband signal provided by the transmitting processor 415 into a radio frequency signal and to transmit the radio frequency signal via the antenna 420. The receiver 416 is configured to convert the radio frequency signal received the antenna 420 into a baseband signal and to provide the baseband signal to the processor 412.

In Downlink (DL), the upper layer packet DL-SCH, including the first information in the present disclosure, is provided to the controller/processor 440. The controller/processor 440 implements the functionality of the L2 layer. In DL, the controller/processor 440 provides header compression, encryption, packet segmentation and reordering, and multiplexing between logical and transport channels, and radio resource allocation to UE 450 based on various priorities. The controller/processor 440 is also responsible for HARQ operations, retransmission of lost packets, and a signaling to the UE 450. The transmitting processor 415 implements various signal transmission processing functions for the L1 layer (i.e., the physical layer), including generating the L reference signal groups of the present disclosure. The signal processing functions include encoding and interleaving to facilitate forward error correction (FEC) at the UE 450 and modulating the baseband signal based on various modulation schemes (e.g., binary phase shift keying (BPSK), quadrature phase shift keying (QPSK)), dividing the modulation symbols into parallel streams and mapping each stream to a corresponding multi-carrier subcarrier and/or multi-carrier symbol, and then transmitting the mapped symbol streams from the transmitting processor 415 via the transmitter 416 to the antenna 420 in the form of a radio frequency signal. The first information, the K piece(s) of target information, and the Q target wireless signal groups in the present disclosure are transmitted by the transmitting processor 415 via the transmitter 416 to the antenna 420 in the form of a radio frequency signal. At the receiving end, each receiver 456 receives a radio frequency signal through its respective antenna 460. Each receiver 456 recovers the baseband information modulated onto the radio frequency carrier and provides the baseband information to the receiving processor 452. The receiving processor 452 implements various signal receiving processing functions of the L1 layer. The signal reception processing function includes receiving the physical layer signal of the first information, K piece(s) of target information, and Q target wireless signal groups in the present discourse, multi-carrier symbols in a multi-carrier symbol stream based on various modulation schemes, demodulating based on various modulation schemes (e.g., binary phase shift keying (BPSK), quadrature phase shift keying (QPSK)) by multi-carrier symbols in a multi-carrier symbol stream, subsequently decoding and deinterleaving to recover data or control transmitted by the gNB 410 on the physical channel, and then providing data and control signals to the controller/processor 490. The controller/processor 490 implements the L2 layer. The controller/processor can be associated with a memory 480 that stores program codes and data. The memory 480 can be referred to as a computer readable medium.

In Uplink (UL) transmission, the upper layer packet DL-SCH, including the first information in the present disclosure, is provided to the controller/processor 440 using the data source 467. The data source 467 represents all protocol layers above the L2 layer. The controller/processor 490 provides header compression, encryption, packet segmentation and reordering, and multiplexing between logical and transport channels to implement L2 layer protocols for the user plane and the control plane. The controller/processor 490 is also responsible for HARQ operations, retransmission of lost packets, and a signaling to the gNB 410. The transmitting processor 455 implements various signal transmission processing functions for the L1 layer (i.e., the physical layer). The signal transmitting processing functions include encoding and interleaving to facilitate forward error correction (FEC) at the UE 350 and modulating the baseband signal based on various modulation schemes (e.g., BPSK, QPSK, etc.), dividing the modulation symbols into parallel streams and mapping each stream to a corresponding multi-carrier subcarrier and/or multi-carrier symbol, and then transmitting the mapped symbol streams from the transmitting processor 455 via the transmitter 456 to the antenna 460 for transmission in the form of a radio frequency signal. The first wireless signal in the present disclosure is generated by the transmitting processor 455 and mapped to the antenna 460 for transmission via the transmitter 456. The receiver 416 receives radio frequency signals through the corresponding antenna 420. Each receiver 416 recovers the baseband information modulated onto the radio frequency carrier and provides the baseband information to the receiving processor 412. The receiving processor 412 implements various signal receiving processing functions for the L1 layer (i.e., the physical layer). The signal receiving processing functions include acquiring multi-carrier symbol stream, demodulating the multi-carrier symbols in a multi-carrier symbol stream based on various modulation schemes (e.g., BPSK, QPSK, etc.), subsequently decoding and deinterleaving to recover data and/or control signals originally transmitted by the UE 450 on the physical channel, and then providing the data and/or control signals to the controller/processor 440. The L2 layer function is implemented at the controller/processor 440. The controller/processor can be associated with a memory 480 that stores program codes and data. The memory 480 can be referred to as a computer readable medium.

In one sub-embodiment, the UE 450 includes: at least one processor and at least one memory. The at least one memory includes computer program code. The at least one memory and the computer program code are configured to be used together with the at least one processor. The UE 450 at least: receives first information, wherein the first information being used to trigger a first operation, receives K piece(s) of target information, and transmits a first wireless signal; wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is(are) used to determine the first power value; the K power offset value(s) is(are) respectively indicated by the K piece(s) of target information; the first information is used to determine P antenna port group(s); the first power value is associated with a first antenna port group; the antenna port group(s) comprises(comprise) a positive integer number of antenna port(s); the P is a positive integer; the K is a positive integer.

In one sub-embodiment, the UE 450 includes a memory storing a computer readable instruction program that, when executed by at least one processor, performs operations. The operations include: receiving first information, wherein the first information being used to trigger a first operation, receiving K piece(s) of target information, and transmitting a first wireless signal; wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is(are) used to determine the first power value; the K power offset value(s) is(are) respectively indicated by the K piece(s) of target information; the first information is used to determine P antenna port group(s); the first power value is associated with a first antenna port group; the antenna port group(s) comprises(comprise) a positive integer number of antenna port(s); the P is a positive integer; the K is a positive integer.

In one sub-embodiment, the gNB 410 includes: at least one processor and at least one memory. The at least one memory includes computer program code. The at least one memory and the computer program code are configured to use with the at least one processor together. The UE 450 at least: transmits first information, wherein the first information being used to trigger a first operation, transmits K piece(s) of target information, and receives a first wireless signal; wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is(are) used to determine the first power value; the K power offset value(s) is(are) respectively indicated by the K piece(s) of target information; the first information is used to determine P antenna port group(s); the first power value is associated with a first antenna port group; the antenna port group(s) comprises(comprise) a positive integer number of antenna port(s); the P is a positive integer; the K is a positive integer.

In one sub-embodiment, the gNB 410 includes: a memory storing a computer readable instruction program that, when executed by at least one processor, performs operations. The operations include: transmitting first information, wherein the first information being used to trigger a first operation, transmitting K piece(s) of target information, and receiving a first wireless signal; wherein a transmission power value of the first wireless signal is a first power value; the first power value is irrelevant to all piece(s) of target information received prior to triggering the first operation; the K piece(s) of target information is(are) received after triggering the first operation; the sum of K power offset value(s) is(are) used to determine the first power value; the K power offset value(s) is(are) respectively indicated by the K piece(s) of target information; the first information is used to determine P antenna port group(s); the first power value is associated with a first antenna port group; the antenna port group(s) comprises(comprise) a positive integer number of antenna port(s); the P is a positive integer; the K is a positive integer.

In one embodiment, the UE 450 corresponds to the user equipment in the present disclosure.

In one embodiment, the gNB 410 corresponds to the base station in the present disclosure.

In one embodiment, the first receiver 101 in Embodiment 3 of the present disclosure includes the antenna 460, the receiver 456, and the receiving processor 452.

In one embodiment, the first receiver 101 in Embodiment 3 of the present disclosure includes the controller/processor 490 and the memory 467.

In one embodiment, the second receiver 102 in Embodiment 3 of the present disclosure includes the antenna 460, the receiver 456, and the receiving processor 452.

In one embodiment, the second receiver 102 in Embodiment 3 of the present disclosure includes the memory 467.

In one embodiment, the first transmitter 103 in Embodiment 3 of the present disclosure includes the antenna 460, the transmitter 456, and the transmission processor 455.

In one embodiment, the first transmitter 103 in Embodiment 3 of the present disclosure includes the controller/processor 490 and the data source 467.

In one embodiment, the second transmitter 401 in Embodiment 4 of the present disclosure includes the antenna 420, the transmitter 416, and the transmission processor 415.

In one embodiment, the second transmitter 401 in Embodiment 4 of the present disclosure includes the controller/processor 440 and the data source 430.

In one embodiment, the third transmitter 402 in Embodiment 4 of the present disclosure includes the antenna 420, the transmitter 416, and the transmission processor 415.

In one embodiment, the third transmitter 402 in Embodiment 4 of the present disclosure includes the data source 430.

In one embodiment, the third receiver 403 in Embodiment 4 of the present disclosure includes the antenna 420, the receiver 416, and the receiving processor 412.

In one embodiment, the third receiver 403 in Embodiment 4 of the present disclosure includes the controller/processor 440 and the memory 430.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, radio sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

The invention claimed is:

1. A method for power adjustment in a user equipment (UE), comprising:
  receiving first information from a base station, wherein:
  the first information is used to trigger a first operation, the first operation including an accumulation reset corresponding to a first power value;
  receiving K piece(s) of target information from the base station, wherein:
  the K piece(s) of target information is(are) received by the UE after triggering of the first operation; and the K is a positive integer;
  transmitting a first wireless signal;
  wherein, the transmission power value of the first wireless signal is the first power value; the first power value is irrelevant to all piece(s) of target information received by the UE prior to triggering the accumulation reset; a sum of K power offset value(s) is used by the UE to calculate the first power value; the K power offset value(s) is(are) respectively indicated by the K piece(s) of target information; the first information is used to determine P antenna port groups, P is an integer larger than 1; the first power value is associated with a first antenna port group; the antenna port group comprises at least one antenna port; the K is a positive integer; the first power value is calculated based on a measurement of the first antenna port group; the target information is a Transmitting Power Control field, the first information is a Radio Resource Control layer signaling; a Reference Signal transmitted by the antenna port is a Channel State Information Reference Signal; the first antenna port group is any one of the P antenna port groups.

2. The method of claim 1, comprising:
  receiving Q target wireless signals; and
  determining Q reference power values;
  wherein the Q target wireless signals are respectively transmitted by Q antenna port groups; the P antenna port groups are a subset of the Q antenna port groups, the first antenna port group is one of the Q antenna port groups; measurements by the UE for the Q target wireless signals are respectively used to determine the Q reference power values; the Q is greater than or equal to the P; and the Q antenna port groups are used for downlink communications transmitted by the base station; the first power value is one of the Q reference power values; a unit of the reference power value is dBm; the measurement includes a pathloss value.

3. The method of claim 2, wherein the first information comprises P sub-information blocks; the P sub-information blocks respectively correspond to the P antenna port groups; the sub-information block indicates at least one of an index of the corresponding antenna port group or a parameter set of the corresponding antenna port group; the parameter set includes a compensation factor for a pathloss value, a linear coefficient between a corresponding reference power value and the pathloss value is the compensation factor.

4. The method of claim 3, the parameter set includes one type-one desired power, the corresponding reference power value is linearly related to the type-one desired power, the linear coefficient between the corresponding reference power value and the type-one desired power is 1.

5. The method of claim 2, wherein the accumulation reset of the first power value is triggered when the P antenna port groups of the Q antenna port groups are reconfigured.

6. The method of claim 1, wherein the K piece(s) of target information belongs to K DCI(s); the K DCI(s) respectively comprises(comprise); a first signaling is the latest received one among the K DCI(s); the first signaling comprises scheduling information of the first wireless signal; the scheduling information comprises at least one of occupied time domain resources, occupied frequency domain resources, Modulation and Coding Status, Hybrid Automatic Repeat request process numbers, Redundancy Version, or New Data Indicator; the transport channel corresponding to the first wireless signal is an Uplink Shared Channel(UL-SCH), or, the physical layer channel corresponding to the first wireless signal is a Physical Uplink Shared Channel (PUSCH).

7. The method of claim 1, wherein the measurement includes a pathloss value,
  or,
  the phrase the first power value is associated with the first antenna port group means that: the measurement of the first antenna port group includes measurements for all of the antenna ports in the first antenna port group, or, the measurement of the first antenna port group includes measurements for a part of the antenna ports in the first antenna port group.

8. A method for power adjustment in a base station, comprising:
 transmitting first information, wherein:
 the first information is used to trigger a first operation, the first operation including an accumulation reset corresponding to a first power value;
 transmitting K piece(s) of target information, wherein:
 the K piece(s) of target information is(are) received after triggering of the first operation; and the K is a positive integer;
 receiving a first wireless signal;
 wherein, the transmission power value of the first wireless signal is the first power value; the first power value is irrelevant to all piece(s) of target information prior to triggering the accumulation reset; a sum of K power offset value(s) is used to calculate the first power value; the K power offset value(s) is(are) respectively indicated by the K piece(s) of target information; the first information is used to determine P antenna port groups, P is an integer larger than 1; the first power value is associated with a first antenna port group; the antenna port group comprises at least one antenna port; the K is a positive integer; the first power value is calculated based on a measurement of the first antenna port group; the target information is a Transmitting Power Control field, the first information is a Radio Resource Control layer signaling; a Reference Signal transmitted by the antenna port is a Channel State Information Reference Signal; the first antenna port group is any one of the P antenna port groups; the measurement includes a pathloss value.

9. The method of claim 8, wherein the first information comprises P sub-information blocks; the P sub-information blocks respectively correspond to the P antenna port groups; the sub-information block indicates at least one of an index of the corresponding antenna port group or a parameter set of the corresponding antenna port group; the parameter set includes a compensation factor for a pathloss value, a linear coefficient between a corresponding reference power value and the pathloss value is the compensation factor.

10. The method of claim 9, wherein the accumulation reset of the first power value is triggered when the P antenna port groups of the Q antenna port groups are reconfigured.

11. A user equipment (UE) for power adjustment, comprising:
 a first receiver receiving first information from a base station, wherein:
 the first information is used to trigger a first operation, the first operation including an accumulation reset corresponding to a first power value;
 a second receiver receiving K piece(s) of target information from the base station, wherein:
 the K piece(s) of target information is(are) received by the UE after triggering of the first operation; and the K is a positive integer;
 a first transmitter transmitting a first wireless signal;
 wherein, the transmission power value of the first wireless signal is the first power value; the first power value is irrelevant to all piece(s) of target information received by the UE prior to triggering the accumulation reset; a sum of K power offset value(s) is used by the UE to calculate the first power value; the K power offset value(s) is(are) respectively indicated by the K piece(s) of target information; the first information is used to determine P antenna port groups, P is an integer larger than 1; the first power value is associated with a first antenna port group; the antenna port group comprises at least one antenna port; the K is a positive integer; the first power value is calculated based on a measurement of the first antenna port group; the target information is a Transmitting Power Control field, the first information is a Radio Resource Control layer signaling; a Reference Signal transmitted by the antenna port is a Channel State Information Reference Signal; the first antenna port group is any one of the P antenna port groups.

12. The user equipment of claim 11, comprising:
 a first receiver receiving Q target wireless signals; and determining Q reference power values;
 wherein the Q target wireless signals are respectively transmitted by Q antenna port groups; the P antenna port groups are a subset of the Q antenna port groups, the first antenna port group is one of the Q antenna port groups; measurements by the UE for the Q target wireless signals are respectively used to determine the Q reference power values; the Q is greater than or equal to the P; and the Q antenna port groups are used for downlink communications transmitted by the base station; the first power value is one of the Q reference power values; a unit of the reference power value is dBm; the measurement includes a pathloss value.

13. The user equipment of claim 12, wherein the first information comprises P sub-information blocks; the P sub-information blocks respectively correspond to the P antenna port groups; the sub-information block indicates at least one of an index of the corresponding antenna port group or a parameter set of the corresponding antenna port group; the parameter set includes a compensation factor for a pathloss value, a linear coefficient between a corresponding reference power value and the pathloss value is the compensation factor.

14. The user equipment of claim 13, wherein the parameter set includes one type-one desired power, the corresponding reference power value is linearly related to the type-one desired power, the linear coefficient between the corresponding reference power value and the type-one desired power is 1.

15. The user equipment of claim 12, wherein the accumulation reset of the first power value is triggered when the P antenna port groups of the Q antenna port groups are reconfigured.

16. The user equipment of claim 11, wherein the K piece(s) of target information belongs to K DCI(s); the K DCI(s) respectively comprises(comprise); a first signaling is the latest received one among the K DCI(s); the first signaling comprises scheduling information of the first wireless signal; the scheduling information comprises at least one of occupied time domain resources, occupied frequency domain resources, Modulation and Coding Status, Hybrid Automatic Repeat request process numbers, Redundancy Version, or New Data Indicator; the transport channel corresponding to the first wireless signal is an Uplink Shared Channel(UL-SCH), or, the physical layer channel corresponding to the first wireless signal is a Physical Uplink Shared Channel (PUSCH).

17. The user equipment of claim 11, wherein the measurement includes a pathloss value,
 or,
 the phrase the first power value is associated with the first antenna port group means that: the measurement of the first antenna port group includes measurements for all of the antenna ports in the first antenna port group, or, the measurement of the first antenna port group includes measurements for a part of the antenna ports in the first antenna port group.

18. A base station for power adjustment, comprising:

a second transmitter transmitting first information, wherein:

the first information is used to trigger a first operation, the first operation including an accumulation reset corresponding to a first power value;

a third transmitter transmitting K piece(s) of target information, wherein:

the K piece(s) of target information is(are) received after triggering of the first operation; and the K is a positive integer;

a third receiver receiving a first wireless signal;

wherein, the transmission power value of the first wireless signal is the first power value; the first power value is irrelevant to all piece(s) of target information prior to triggering the accumulation reset; a sum of K power offset value(s) is used to calculate the first power value; the K power offset value(s) is(are) respectively indicated by the K piece(s) of target information; the first information is used to determine P antenna port groups, P is an integer larger than 1; the first power value is associated with the first antenna port group; the antenna port group comprises at least one antenna port; the K is a positive integer; the first power value is calculated based on a measurement of the first antenna port group; the target information is a Transmitting Power Control field, the first information is a Radio Resource Control layer signaling; a Reference Signal transmitted by the antenna port is a Channel State Information Reference Signal; the first antenna port group is any one of the P antenna port groups.

19. The base station of claim 18, wherein the first information comprises P sub-information blocks; the P sub-information blocks respectively correspond to the P antenna port groups; the sub-information block indicates at least one of an index of the corresponding antenna port group or a parameter set of the corresponding antenna port group; the parameter set includes a compensation factor for a pathloss value, a linear coefficient between a corresponding reference power value and the pathloss value is the compensation factor.

20. The base station of claim 19, wherein the accumulation reset of the first power value is triggered when the P antenna port groups of the Q antenna port groups are reconfigured.

* * * * *